Patented June 6, 1933

1,912,421

UNITED STATES PATENT OFFICE

BODO ZSCHIMMER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

COLORED LACQUER

No Drawing. Application filed August 4, 1927, Serial No. 210,724, and in Germany August 13, 1926.

The usual practice when coloring lacquers such as spirit lacquer, zapon varnishes and the like with dissolved dyestuffs is to employ basic dyestuffs, but lacquers colored in this manner are poor as regards fastness to light.

I have now found that lacquers and especially those which contain cellulose derivatives such as cellulose esters and ethers, and also spirit lacquers, oil lacquers and the like, are colored very fast to light by incorporating with them basic dyestuffs, which may also contain acid groups, and complex acids capable of forming color lakes with the dyestuffs which may be employed in the free state, but are more preferably employed in the state of salts. Presumably a combination between the dyestuff and the complex acid takes place in the lacquer. The method of working may consist, for example, in adding to the lacquer the basic dyestuffs, either in the solid form or dissolved in a suitable organic solvent, as which may be used alcohols, glycol, glycerol or their esters and ethers, acetone and the like, followed by the addition of the complex acid or its salts in the solid form or of their solution in an organic solvent of the kind mentioned for dissolving the basic dyestuff. Again, the solid or dissolved complex acid or its salts may be added to the lacquer first, followed by the addition of the basic dyestuff or its solution; or the operation may be carried out in any other known or suitable manner. In the case of lacquers being miscible with water, the basic dyestuffs and the complex acids, or their salts, may also be used in an aqueous solution. Suitable complex acids are for example phosphotungstic acid, phosphomolybdic acid, phosphotungstomolybdic acid, silicotungstic acid and the like.

The following examples will further illustrate how the said invention may be carried into practical effect but the invention is not limited thereto. The parts are by weight.

Example 1

0.5 part of methyl violet B extra (see Schultz, Farbstofftabellen, 1923 edition, No. 515) is dissolved in 100 parts of a zapon lacquer containing 5 per cent of nitrocellulose with or without a plasticizer, 0.5 part of sodium phosphotungstate, dissolved in the proportion of 1 to 10 in denatured alcohol, being then stirred in. The lacquer coatings dry perfectly limpid and have the advantage of being much faster to light than if colored with methyl violet B extra alone.

Example 2

0.5 part of alkali blue B extra (Schultz, Farbstofftabellen, 1923, No. 536) is dissolved in 100 parts of a shellac spirit lacquer, 0.5 part of sodium phosphotungstate, as a 1 to 10 solution in denatured alcohol, being then added. The additions may also be made in reverse order, that is to say, the sodium phosphotungstate may be added first, and the dyestuff afterwards.

Coatings effected with this lacquer are substantially faster to light than those obtained without the addition of sodium phosphotungstate.

What I claim is:

1. The process of preparing colored lacquers which comprises combining within the lacquer body a basic dyestuff and a compound selected from the group consisting of complex inorganic acids capable of forming a colored lake with the dyestuff and containing at least one element selected from the group consisting of silicon, phosphorus, tungsten and molybdenum, and salts of said acids.

2. The process of preparing colored lacquers which comprises combining within the lacquer body a basic dyestuff and a compound selected from the group consisting of complex inorganic acids capable of forming a colored lake with the dyestuff and containing phosphorus and an element selected from the group consisting of molybdenum and tungsten, and salts of said acids.

3. The process of preparing colored lacquers which comprises combining within the lacquer body a basic dyestuff and a compound selected from the group consisting of complex inorganic acids capable of forming a colored lake with the basic dyestuff and containing at least one element selected from the group consisting of silicon and phosphorus and at least one element selected from the group consisting of tungsten and molybdenum, and salts of said acids.

In testimony whereof I have hereunto set my hand.

BODO ZSCHIMMER.